(12) United States Patent
Syouda et al.

(10) Patent No.: US 12,424,855 B2
(45) Date of Patent: Sep. 23, 2025

(54) BATTERY CONTROL DEVICE AND BATTERY SYSTEM

(71) Applicant: Yazaki Corporation, Tokyo (JP)

(72) Inventors: Takahiro Syouda, Susono (JP); Chihiro Ono, Susono (JP)

(73) Assignee: Yazaki Corporation, Tokyo (JP)

( * ) Notice: Subject to any disclaimer, the term of this patent is extended or adjusted under 35 U.S.C. 154(b) by 392 days.

(21) Appl. No.: 17/406,190

(22) Filed: Aug. 19, 2021

(65) Prior Publication Data
US 2022/0060029 A1   Feb. 24, 2022

(30) Foreign Application Priority Data

Aug. 19, 2020  (JP) .................................. 2020-138461
Apr. 16, 2021  (JP) .................................. 2021-069926

(51) Int. Cl.
*H02J 7/00*   (2006.01)

(52) U.S. Cl.
CPC .......... *H02J 7/0016* (2013.01); *H02J 7/0048* (2020.01); *H02J 7/00712* (2020.01)

(58) Field of Classification Search
CPC ...... H02J 7/0016; H02J 7/0048; H02J 7/0063; H02J 7/00712; H02J 7/007186; Y02T 10/70

See application file for complete search history.

(56) References Cited

U.S. PATENT DOCUMENTS

| | | | |
|---|---|---|---|
| 2006/0152196 A1* | 7/2006 | Matsumoto | H02J 7/007182 320/132 |
| 2017/0088072 A1* | 3/2017 | Curtis | G08B 31/00 |
| 2018/0233913 A1* | 8/2018 | Ishigaki | H01M 10/44 |
| 2020/0295589 A1* | 9/2020 | Maresh | B60R 16/033 |
| 2021/0300206 A1* | 9/2021 | Martinsson | H02J 7/0019 |

FOREIGN PATENT DOCUMENTS

| | | | | |
|---|---|---|---|---|
| CN | 108400636 A | | 8/2018 | |
| JP | 2013031247 A | * | 2/2013 | .......... B60L 11/1809 |
| JP | 2013-090525 A | | 5/2013 | |
| JP | 2013-128347 A | | 6/2013 | |
| JP | 2016-119788 A | | 6/2016 | |
| WO | WO-2013060802 A1 | * | 5/2013 | .......... G06F 1/3203 |

* cited by examiner

*Primary Examiner* — Jack Chiang
*Assistant Examiner* — Aric Lin
(74) *Attorney, Agent, or Firm* — Banner & Witcoff, Ltd.

(57) ABSTRACT

A battery control device controls a battery system including a plurality of battery cells connected in series and a bypass circuit that bypasses each of the battery cells. Discharge is performed from each of the battery cells until remaining quantity of the battery cell decreases to a predetermined value. When the remaining quantity of the battery cell is decreased to the predetermined value, each of the battery cells is bypassed by the bypass circuit. When the remaining quantity of all of the plurality of battery cells is decreased to the predetermined value, discharge is performed from all of the plurality of battery cells.

2 Claims, 10 Drawing Sheets

FIG. 2
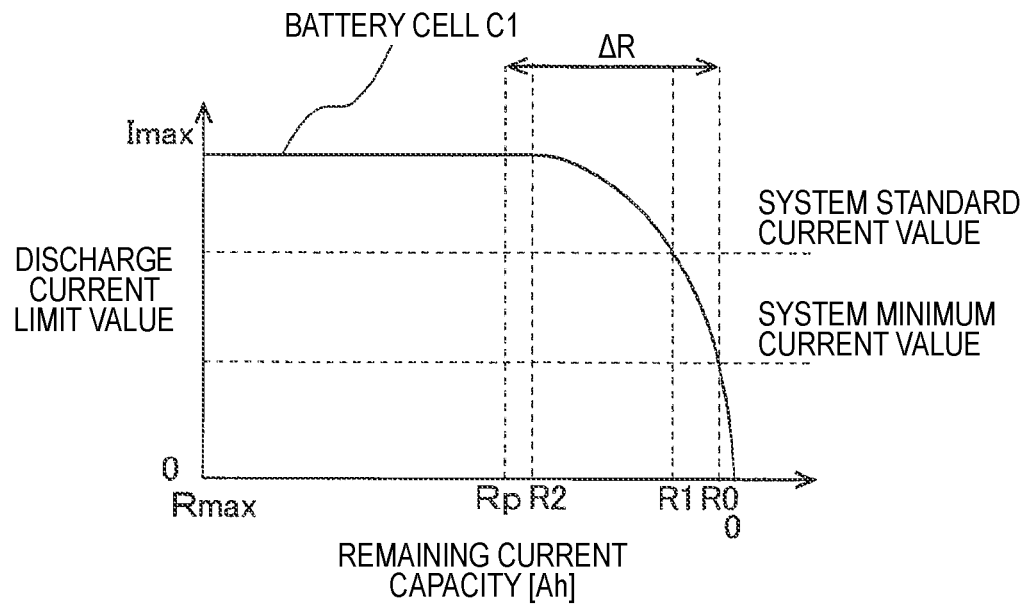
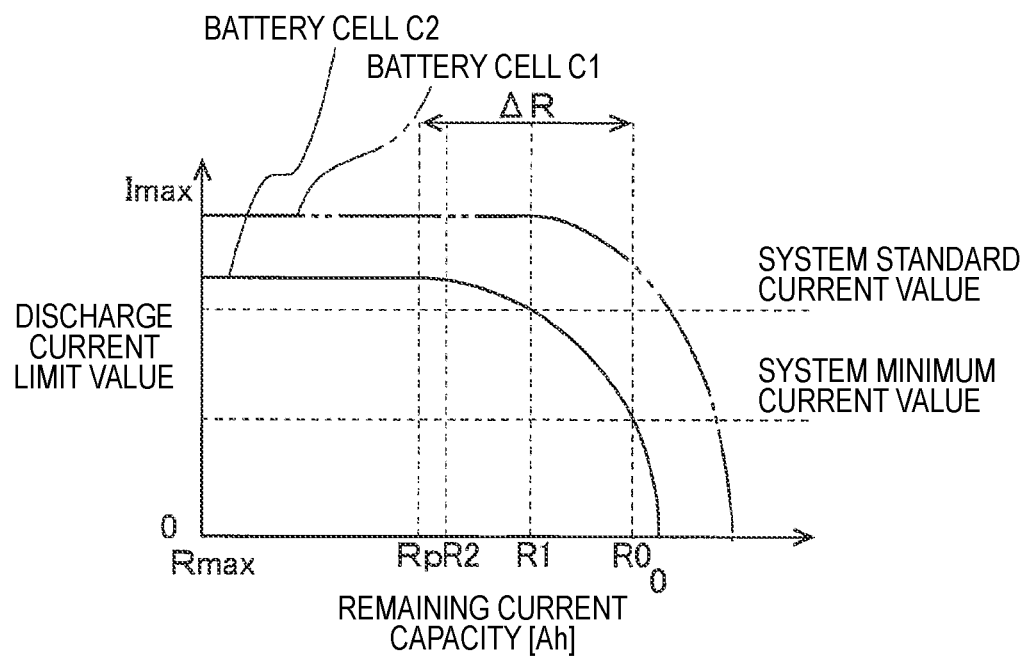

FIG. 6

| CELL | t0 Remaining Discharge Capacity [Ah] | t0 Amount of Discharge [Ah] | t1 Remaining Discharge Capacity [Ah] | t1→t2 Amount of Discharge [Ah] | t2 Remaining Discharge Capacity [Ah] | t2→t3 Amount of Discharge [Ah] | t3 Remaining Discharge Capacity [Ah] | t3→t4 Amount of Discharge [Ah] | t4 Remaining Discharge Capacity [Ah] | t4→t5 Amount of Discharge [Ah] | t5 Remaining Discharge Capacity [Ah] | t5→t6 Amount of Discharge [Ah] | t6 Remaining Discharge Capacity [Ah] | t6→t7 Amount of Discharge [Ah] | t7 Remaining Discharge Capacity [Ah] | t7→t8 Amount of Discharge [Ah] | t8 Remaining Discharge Capacity [Ah] |
|---|---|---|---|---|---|---|---|---|---|---|---|---|---|---|---|---|---|
| C1 | 100 | 86 | 14 | 1 | 13 | 2 | 11 | 1 | 10 | 5 | 5 | 3 | 2 | 1 | 1 | 1 | 0 |
| C2 | 99 | 86 | 13 | 1 | 12 | 2 | 10 | 1 | 9 | 4 | 5 | 3 | 2 | 1 | 1 | 1 | 0 |
| C3 | 98 | 86 | 12 | 1 | 11 | 2 | 9 | 1 | 8 | 3 | 5 | 2 | 3 | 1 | 2 | 2 | 0 |
| C4 | 90 | 86 | 4 | 1 | 3 | 2 | 1 | 1 | 0 | 0 | 0 | 0 | 0 | 0 | 0 | 0 | 0 |
| C5 | 89 | 86 | 3 | 1 | 2 | 2 | 0 | 0 | 0 | 0 | 0 | 0 | 0 | 0 | 0 | 0 | 0 |
| C6 | 87 | 86 | 1 | 1 | 0 | 0 | 0 | 0 | 0 | 0 | 0 | 0 | 0 | 0 | 0 | 0 | 0 |
| C7 | 86 | 86 | 0 | 0 | 0 | 0 | 0 | 0 | 0 | 0 | 0 | 0 | 0 | 0 | 0 | 0 | 0 |
| C8 | 86 | 86 | 0 | 0 | 0 | 0 | 0 | 0 | 0 | 0 | 0 | 0 | 0 | 0 | 0 | 0 | 0 |

FIG. 8

| CELL | t0 Remaining Discharge Capacity [Ah] | t1~t2 Amount of Discharge [Ah] | t1~t2 Remaining Discharge Capacity [Ah] | t2~t3 Amount of Discharge [Ah] | t2~t3 Remaining Discharge Capacity [Ah] | t3~t4 Amount of Discharge [Ah] | t3~t4 Remaining Discharge Capacity [Ah] | t4~t5 Amount of Discharge [Ah] | t4~t5 Remaining Discharge Capacity [Ah] | t5~t6 Amount of Discharge [Ah] | t5~t6 Remaining Discharge Capacity [Ah] | t6~ Amount of Discharge [Ah] | t6~ Remaining Discharge Capacity [Ah] |
|---|---|---|---|---|---|---|---|---|---|---|---|---|---|
| C1 | 100 | 7 | 93 | 2 | 91 | 1 | 90 | 1 | 89 | 3 | 86 | 86 | 0 |
| C2 | 99 | 7 | 92 | 2 | 90 | 1 | 89 | 0 | 89 | 3 | 86 | 86 | 0 |
| C3 | 98 | 7 | 91 | 0 | 91 | 1 | 90 | 1 | 89 | 3 | 86 | 86 | 0 |
| C4 | 95 | 7 | 88 | 2 | 86 | 0 | 86 | 0 | 86 | 0 | 86 | 86 | 0 |
| C5 | 90 | 0 | 90 | 0 | 90 | 0 | 90 | 1 | 89 | 3 | 86 | 86 | 0 |
| C6 | 89 | 0 | 89 | 0 | 89 | 0 | 89 | 0 | 89 | 3 | 86 | 86 | 0 |
| C7 | 87 | 0 | 87 | 0 | 87 | 0 | 87 | 1 | 86 | 0 | 86 | 86 | 0 |
| C8 | 86 | 0 | 86 | 0 | 86 | 0 | 86 | 0 | 86 | 0 | 86 | 86 | 0 |

FIG.9

BATTERY CONTROL DEVICE AND BATTERY SYSTEM

CROSS-REFERENCE TO RELATED APPLICATIONS

This application is based on and claims priority under 35 USC 119 from Japanese Patent Applications No. 2020-138461 filed on Aug. 19, 2020, and No. 2021-069926 filed on Apr. 16, 2021 the contents of which are incorporated herein by reference.

TECHNICAL FIELD

The present invention relates to a battery control device and a battery system.

BACKGROUND ART

As a discharge system that controls discharge of a battery device (hereinafter, referred to as "battery pack") in which a plurality of batteries (hereinafter, referred to as "battery cells") are connected in series, there is known a configuration in which a battery cell excluded from discharge is selected on the basis of a state of each of the battery cells, and discharge is performed from another battery cell by bypassing the battery cell excluded from the discharge (for example, refer to Patent Document 1).

Patent Document 1: JP-A-2013-31247

In the discharge system described in Patent Document 1, when a battery cell that is discharged up to a discharge termination voltage is selected as the battery cell excluded from discharge, and discharge is sequentially performed from other battery cells by bypassing the battery cell, discharge can be performed with respect to all battery cells without leaving discharge capacity.

However, a discharge current limit value that is an allowable value of a discharge current, and a system minimum current value that is a current value necessary for a system of a power supply destination to operate in a power saving mode are set in each of the battery cells. Here, the discharge current limit value decreases in accordance with a decrease in battery remaining quantity, and thus it is necessary to select a battery cell in which the discharge current limit value decreases up to the system minimum current value as a battery cell excluded from discharge. Accordingly, it is difficult to discharge all battery cells without leaving discharge capacity, and time for which a desired output is obtained is shortened.

SUMMARY OF INVENTION

The invention has been made in consideration of such circumstances, and an object thereof is to provide a battery control device and a battery system which are capable of discharging all of a plurality of battery cells or except for a part thereof by using discharge capacity with efficiency, and are capable of extending time for which a desired output is obtained.

According to an aspect of the invention, there is provided a battery control device that controls a battery system including a plurality of battery cells connected in series, and a bypass circuit that bypasses each of the battery cells. Discharge is performed from each of the battery cells until remaining quantity of the battery cell decreases to a predetermined value, in a case where the remaining quantity of the battery cell decreases to the predetermined value, the battery cell is bypassed by the bypass circuit, and in a case where the remaining quantity of all of the plurality of battery cells or except for a part thereof decreases to the predetermined value, discharge is performed from all of the plurality of battery cells or except for a part thereof.

According to another aspect of the invention, there is provided a battery control device that controls a battery system including a plurality of batteries connected in series, and a bypass circuit that bypasses each of the batteries. The battery control device executes a first process of reducing a difference in a remaining discharge quantity until completion of discharge of the plurality of batteries by performing bypassing by the bypass circuit with priority given to a battery in which the remaining discharge quantity until completion of discharge is smaller in comparison to the other batteries, and a second process of completing discharge of the plurality of batteries after the first process.

According to still another aspect of the invention, there is provided a battery system including: a plurality of battery cells connected in series; a bypass circuit that bypasses each of the battery cells; and a battery control device that controls the bypass circuit. The battery control device performs discharge from each of the battery cells until remaining quantity of the battery cell decreases to a predetermined value, bypasses the battery cell by the bypass circuit in a case where the remaining quantity of the battery cell decreases to the predetermined value, and performs discharge from all of the plurality of battery cells or except for a part thereof in a case where the remaining quantity of all of the plurality of battery cells or except for a part thereof decreases to the predetermined value.

According to still another aspect of the invention, there is provided a battery system including: a plurality of batteries connected in series; a bypass circuit that bypasses each of the batteries; and a battery control device that controls the bypass circuit. The battery control device executes a first process of reducing a difference in a remaining discharge quantity until completion of discharge of the plurality of batteries by performing bypassing by the bypass circuit with priority given to a battery in which the remaining discharge quantity until completion of discharge is smaller in comparison to the other batteries, and a second process of completing discharge of the plurality of batteries after the first process.

BRIEF DESCRIPTION OF DRAWINGS

FIG. 2 is a graph for describing a predetermined value setting method.

FIG. 6 is a table for describing discharge control of the comparative example illustrated in the timing chart in FIG. 5.

FIG. 8 is a table for describing the discharge control of the other embodiment of the invention which is illustrated in the timing chart in FIG. 7.

FIG. 9 is a table for describing a modification example of the discharge control illustrated in the table in FIG. 8.

DESCRIPTION OF EMBODIMENTS

Hereinafter, description will be given on the basis of a preferred embodiment of the invention. Note that, the invention is not limited to the following embodiments, and can be appropriately modified in a range not departing from the gist of the invention. In addition, in the following embodiments, illustration or description of some configurations are omitted, but it is needless to say that a publicly known or well-known technology is appropriately applied to details of the omitted technology in a range not causing any contradiction with contents to be described below.

Figure 1:
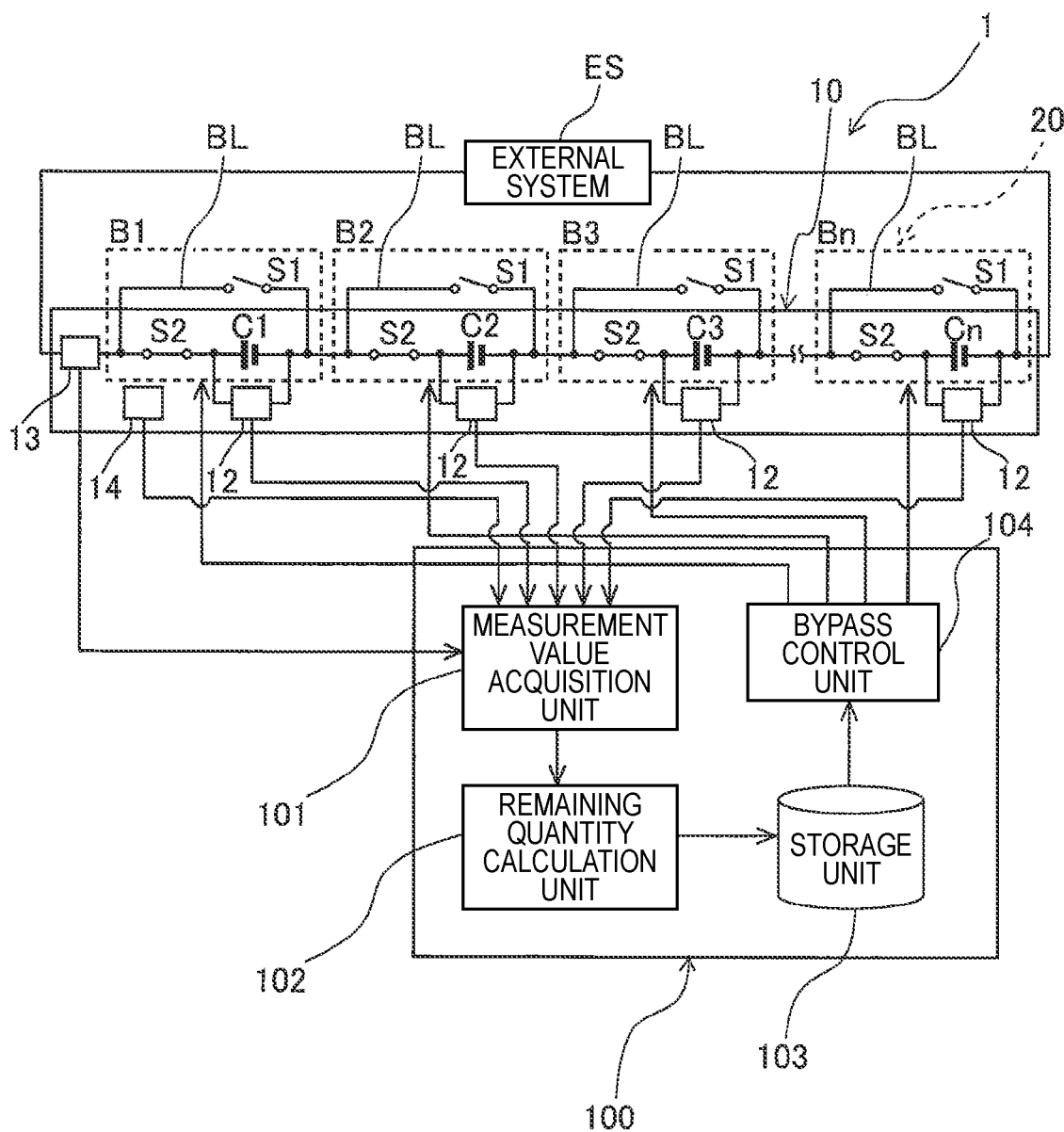
FIG. 1 is a view schematically illustrating a battery system including a battery control device according to one embodiment of the invention.

FIG. 1 is a view schematically illustrating a battery system 1 including a battery control device 100 according to one embodiment of the invention. As illustrated in the drawing, the battery system 1 includes a battery pack 10, a bypass circuit 20, and a battery control device 100. The battery pack 10 is an in-vehicle or stationary power supply including n (n is an integer of two or greater) battery cells C1 to Cn connected in series. Although not particularly limited, the battery pack 10 of this embodiment is a recycled used battery, and there is a difference in the degree of deterioration of the respective battery cells C1 to Cn. For example, the battery cells C1 to Cn are secondary batteries such as a lithium ion battery, and a lithium ion capacitor, are charged through supply of power from an external system ES, and supplies power to the external system ES by discharging the charged power. Note that, the battery system 1 may include n (n is an integer of two or greater) battery modules or battery packs connected in series, and the bypass circuit 20.

The battery pack 10 includes a plurality of voltage measurement units 12, a current measurement unit 13, and a battery temperature measurement unit 14. Each of the voltage measurement units 12 is connected between each positive electrode terminal and each negative electrode terminal of the battery cells C1 to Cn. The voltage measurement unit 12 measures an inter-terminal voltage of each of the battery cells C1 to Cn.

The current measurement unit 13 is provided in a current path of the battery pack 10. The current measurement unit 13 measures a charge and discharge current of the battery pack 10. In addition, the battery temperature measurement unit 14 is provided in the battery pack 10. The battery temperature measurement unit 14 measures a battery temperature of the battery pack 10.

The bypass circuit 20 includes n (n is an integer of two or greater) bypass circuits B1 to Bn, each being provided in each of the battery cells C1 to Cn. Each of the bypass circuits B1 to Bn includes a bypass line BL and switches S1 and S2. The bypass line BL is a power line that bypasses each of the battery cells C1 to Cn. The switch S1 is provided in the bypass line BL. For example, the switch S1 is a mechanical switch. The switch S2 is provided between each positive electrode of the battery cells C1 to Cn and one end of the bypass line BL. For example, the switch S2 is a semiconductor switch.

The battery cell C1 on a starting end side and the battery cell Cn on a terminal end side are connected to the external system ES. In a case where the switch S1 is opened and the switch S2 is closed in all of the bypass circuits B1 to Bn, discharge from all of the battery cells C1 to Cn to the external system ES is performed. On the other hand, in a case where the switch S2 is opened and the switch S1 is closed in any of the bypass circuits B1 to Bn, any of the battery cells C1 to Cn which corresponds to the any of the bypass circuits B1 to Bn is bypassed.

The battery control device 100 is connected to the battery pack 10 and the bypass circuit 20, and executes monitoring and control of the battery cells C1 to Cn, and switching control of the bypass circuits B1 to Bn. The battery control device 100 of this embodiment switches the bypass circuits B1 to Bn on the basis of remaining current capacity of the battery cells C1 to Cn.

The battery control device 100 includes a measurement value acquisition unit 101, a remaining quantity calculation unit 102, a storage unit 103, and a bypass control unit 104.

The measurement value acquisition unit 101 is connected to the voltage measurement unit 12, the current measurement unit 13, and the battery temperature measurement unit 14. The measurement value acquisition unit 101 acquires a measurement value from the voltage measurement unit 12, the current measurement unit 13, and the battery temperature measurement unit 14, and stores the measurement value in the storage unit 103.

The remaining quantity calculation unit 102 calculates the remaining quantity of each of the battery cells C1 to Cn on the basis of the measurement value acquired by the measurement value acquisition unit 101. The remaining quantity calculation unit 102 of this embodiment calculates remaining current capacity of each of the battery cells C1 to Cn on the basis of a variation in a voltage value of each of the battery cells C1 to Cn which is acquired by the measurement value acquisition unit 101, and stores the remaining current capacity in the storage unit 103. Note that, in calculation of the remaining current capacity of each of the battery cells C1 to Cn, another known method may be used.

The storage unit 103 stores the measurement value acquired by the measurement value acquisition unit 101 and the calculation value calculated by the remaining quantity calculation unit 102. In addition, the storage unit 103 stores a program that is executed by the battery control device 100.

The bypass control unit 104 controls open/close switching of the switches S1 and S2 of each of the bypass circuits B1 to Bn on the basis of the remaining current capacity of each of the battery cells C1 to Cn which is calculated by the remaining quantity calculation unit 102. Specifically, in a case where a remaining current capacity of each of the battery cells C1 to Cn exceeds a predetermined value Rp, the bypass control unit 104 opens the switch S1 and closes the switch S2 with respect to corresponding one of the bypass circuits B1 to Bn. That is, in this case, the battery cells C1 to Cn are not bypassed. On the other hand, in a case where the remaining current capacity of each of the battery cells C1 to Cn decreases to the predetermined value Rp or less, the bypass control unit 104 opens the switch S2 and closes the switch S1 with respect to corresponding one of the bypass circuits B1 to Bn. That is, in this case, the battery cells C1 to Cn are bypassed.

Here, with respect to the battery cells C1 to Cn that is set to the bypass state at once, the bypass control unit 104 continues the bypass state until the remaining current capacity of the other all battery cells C1 to Cn decreases to the predetermined value Rp. Then, with respect to all of the bypass circuits B1 to Bn, the bypass control unit 104 opens the switch S1 and closes the switch S2, thereby performing discharge from all of the battery cells C1 to Cn at the same time.

FIG. 2 is a graph for describing a setting method of the predetermined value Rp. An upper graph in the drawing illustrates a relationship between remaining current capacity of the battery cell C1 and a discharge current limit value of the battery cell C1. In addition, a lower graph in the drawing illustrates a relationship between remaining current capacity of the battery cells C1 and C2, and a discharge current limit value of the battery cells C1 and C2. Here, the discharge current limit value is an allowable value of the discharge current that is set from the viewpoint of maintaining the performance of respective parts constituting the battery cells C1 to Cn or preventing damage of the respective parts.

As illustrated in the graph in FIG. 2, while the remaining current capacity of the battery cells C1 and C2 decreases from a maximum state (full charge: Rmax), the discharge current limit value of the battery cells C1 and C2 is constant at the beginning but decreases from the middle. Here, the discharge current limit value of each of the battery cells C1 to Cn is not the same as each other and is different between the battery cells C1 to Cn. In addition, the relationship between the discharge current limit value and the remaining current capacity of each of the battery cells C1 to Cn is not the same as each other and is different between the battery cells C1 to Cn. Particularly, the battery pack 10 of this embodiment is a recycled used battery pack, and there is a difference in the degree of deterioration of the respective battery cells C1 to Cn. Accordingly, in the battery pack 10 of this embodiment, a deviation of the discharge current limit value between the battery cells C1 to Cn, or a deviation of the relationship between the discharge current limit value and the remaining current capacity is large.

In addition, from the viewpoint of corresponding to an operation situation of the external system ES that supplies power from the battery pack 10, a system standard current value and a system minimum current value are set in each of the battery cells C1 to Cn. The system standard current value is a current value higher than the system minimum current value, and is a threshold value as to whether or not to impose a limit on power consumption of the external system ES. For example, in a case where the external system ES is an electric vehicle, the system standard current value corresponds to a current value of maximum consumption when travelling without any limitation within a speed determined in specifications of the vehicle. In a case where the discharge current limit value of each of the battery cells C1 to Cn becomes equal to or less than the system standard current value, a travelling speed of the electric vehicle is limited to 60 km/h or less, and the external system ES operates in a power saving mode. On the other hand, the system minimum current value is a maximum current value necessary for the external system ES to operate in the power saving mode. For example, in a case where the external system ES is an electric vehicle, the system minimum current value corresponds to a maximum consumption current value when the vehicle travels at a speed of 60 km/h or less. In a case where the discharge current limit value of each of the battery cells C1 to Cn becomes equal to or less than the system minimum current value, it is determined that travelling at a speed of 60 km/h is not guaranteed, and thus driving of the vehicle is stopped as an electricity lack state.

Here, the predetermined value Rp is set so that a difference $\Delta R$ ($=Rp-R0$) between a remaining current capacity $R0$ at a point of time at which the discharge current limit value and the system minimum current value match each other, and the predetermined value Rp becomes constant over all of the battery cells C1 to Cn. In addition, the predetermined value Rp is set to be equal to or greater than a remaining current capacity $R1$ at a point of time at which the discharge current limit value and the system standard current value match each other. In addition, in this embodiment, the predetermined value Rp is set to be equal to or greater than the remaining current capacity $R2$ at a point of time at which the discharge current limit value starts to decrease from a maximum value Imax.

Figure 3:
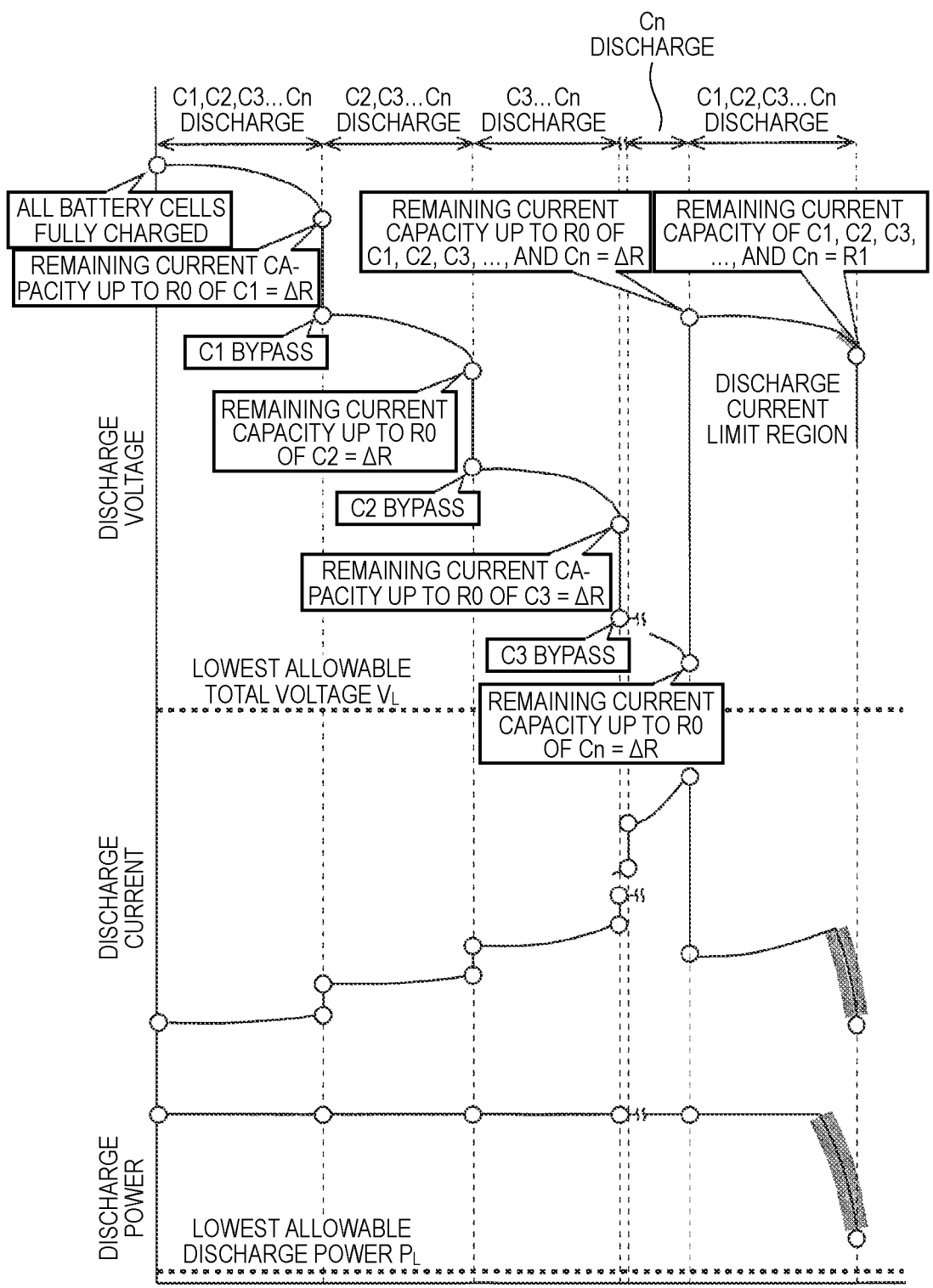
FIG. 3 is a timing chart for describing discharge control of a battery pack by the battery control device.

FIG. 3 is a timing chart for describing discharge control of the battery pack 10 by the battery control device 100. As illustrated in the timing chart, description will be given of a case where all of the battery cells C1 to Cn are discharged from a fully charged state as an example.

In a state in which all of the battery cells C1 to Cn are fully charged, the battery control device 100 performs discharge from all of the battery cells C1 to Cn. That is, with respect to all of the bypass circuits B1 to Bn, the switch S1 is opened, and the switch S2 is closed. The battery control device 100 monitors the remaining current capacity of each of the battery cells C1 to Cn which is calculated by the remaining quantity calculation unit 102, and always determines whether or not the remaining current capacity of each of the battery cells C1 to Cn exceeds the predetermined value Rp.

In the case of detecting a battery cell (for example, C1 as illustrated in the drawing) in which the remaining current capacity is the predetermined value Rp, with respect to the bypass circuit B1 corresponding to the battery cell C1, the battery control device 100 opens the switch S2 and closes the switch S1. That is, the battery control device 100 bypasses the battery cell C1 in which the remaining current capacity decreases to the predetermined value Rp, and performs discharge from the other all battery cells C2, C3, . . . , and Cn.

Whenever the battery cells C2 to Cn in which the remaining current capacity is equal to or less than the predetermined value Rp are detected, the battery control device 100 sequentially performs control of bypassing the corresponding battery cells C2 to Cn, and performing discharge from the other all battery cells C3 to Cn. For example, as illustrated in the drawing, with respect to the bypass circuit B2 corresponding to the battery cell C2 in which the remaining current capacity is the predetermined value Rp, the battery control device 100 opens the switch S2 and closes the switch S1. That is, the battery control device 100 bypasses the battery cell C2 in which the remaining current capacity decreases to the predetermined value Rp, and performs discharge from the other all battery cells C3, . . . , and Cn.

The battery control device 100 executes the above-described process until the remaining current capacity of all of the battery cells C1 to Cn decreases to the predetermined value Rp, and after the remaining current capacity of all of the battery cells C1 to Cn decreases to the predetermined value Rp, with respect to the bypass circuits B1 to Bn of all of the battery cells C1 to Cn, the battery control device 100 opens the switch S1 and closes the switch S2. That is, after the remaining current capacity of all of the battery cells C1 to Cn is made uniform to the predetermined value Rp, the battery control device 100 releases bypassing of all of the battery cells C1 to Cn, and performs discharge from all of the battery cells C1 to Cn. According to this, the discharge current limit value of all of the battery cells C1 to Cn decreases to the system minimum current value at the same time. Accordingly, all of the battery cells C1 to Cn can be discharged by using larger discharge capacity.

Here, in a case where discharge power is constantly maintained except for a discharge current limit period, since the battery cells C1 to Cn in which the remaining current capacity has decreased to the predetermined value Rp are sequentially bypassed, a discharge voltage is sequentially lowered, but a discharge current is sequentially raised. Accordingly, a desired output can be obtained over a long period in one discharge cycle of the battery pack 10.

In addition, the discharge current limit period can be put into one period (end period) in one discharge cycle of the battery pack 10. Particularly, in an electric vehicle, in a case where the discharge current limit value of the battery cells C1 to Cn fluctuates up and down with the system standard current value set as a boundary value, the power saving mode and release of the mode are repeated, and thus a user feels uncomfortable. Here, in this embodiment, the predetermined value Rp is set to be equal to or greater than remaining current capacity R1 at a point of time at which the discharge current limit value and the system standard current value match each other. According to this, in the electric vehicle, it is possible to prevent the power saving mode and release of the mode from being repeated, and discomfort of the user can be removed.

Here, from the viewpoint of guaranteeing an operation of a load, it is necessary to prevent a total voltage [V] of the battery system 1 in discharge from being lower than a lowest allowable total voltage $V_L$. For example, the lowest allowable total voltage $V_L$ is set on the basis of specifications of the load, and is determined by an input voltage of a DC/AC inverter in the case of a system association type stationary battery system and is determined by a range of an input voltage of an inverter of a motor in the case of an in-vehicle battery system. Here, in this embodiment, bypass control of the battery cells C1 to Cn by the bypass circuits B1 to Bn is executed so that the total voltage [V] of the battery system 1 is maintained to the lowest allowable total voltage $V_L$ or greater from initiation of discharge to completion of discharge.

In addition, in this embodiment, while the bypass control of the battery cells C1 to Cn by the bypass circuits B1 to Bn is executed, the discharge power limit value [W] is maintained to lowest allowable discharge power PL or greater. Here, the discharge power limit value [W] is a value obtained by multiplying a minimum value among discharge current limit values of the battery cells C1 to Cn by the total voltage of the battery system 1. Note that, the lowest allowable discharge power PL may be a constant value or a value that fluctuates in accordance with various conditions.

Hereinbefore, description has been given of the invention with reference to the embodiment, but the invention is not limited to the above-described embodiment, and modifications may be made within a range not departing from the gist of the invention, or a publicly known or well-known technology may be appropriately combined thereto.

For example, in the above-described embodiment, the remaining quantity of each of the battery cells C1 to Cn is defined with the remaining current capacity, but the remaining quantity of each of the battery cells C1 to Cn may be defined with a state of charge (SOC) or a voltage of each of the battery cells C1 to Cn.

In addition, in the above-described embodiment, control of discharging all of the battery cells C1 to Cn until the discharge current limit value decreases to the system minimum current value is executed. However, for example, the same control may be executed with respect to a plurality of battery cells excluding a battery cell in which deterioration is in progress, or a battery cell in which a temperature is high.

Figure 4:
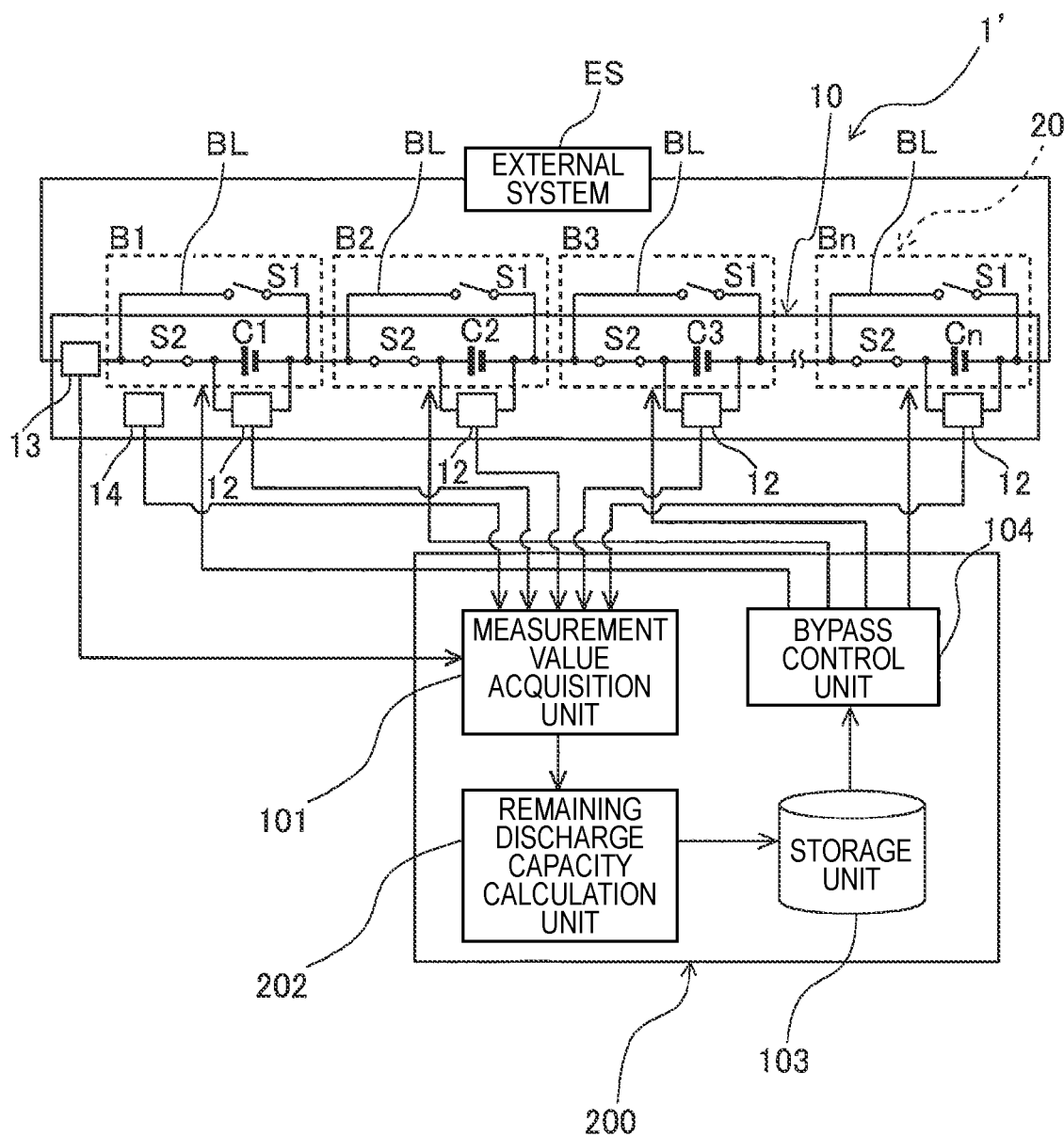
FIG. 4 is a view schematically illustrating a battery system including a battery control device according to another embodiment of the invention.

FIG. 4 is a view schematically illustrating a battery system 1' including a battery control device 200 according to another embodiment of the invention. The battery system 1' illustrated in the drawing includes the battery pack 10, the bypass circuit 20, and a battery control device 200. Note that, the same reference numeral will be given to the same configuration as in the above-described embodiment, and description relating to the above-described embodiment will be cited.

The battery control device 200 of this embodiment includes a remaining discharge capacity calculation unit 202 instead of the remaining quantity calculation unit 102 in the above-described embodiment. The battery control device 200 is connected to the battery pack 10 and the bypass circuit 20, and executes monitoring and control of each of the battery cells C1 to Cn and switching control of each of the bypass circuits B1 to Bn. The battery control device 200 controls discharge of the battery pack 10 by switching each of the bypass circuits B1 to Bn on the basis of remaining discharge capacity RD until completion of discharge of each of the battery cells C1 to Cn. Note that, in the following description, the remaining discharge capacity RD until completion of discharge of each of the battery cells C1 to Cn is simply referred to as "remaining discharge capacity RD". The remaining discharge capacity RD is capacity capable of being discharged until reaching a discharge final voltage at the timing of discharging each of the battery cells C1 to Cn.

The remaining discharge capacity calculation unit 202 calculates the remaining discharge capacity RD of each of the battery cells C1 to Cn on the basis of a measurement value measured by the measurement value acquisition unit 101, and stores the remaining discharge capacity RD in the storage unit 103. The remaining discharge capacity calculation unit 202 of this embodiment calculates the remaining discharge capacity RD [Ah] of each of the battery cells C1 to Cn by the following Expression (1).

$$RD\ [Ah] = CC \times SOC/100 \tag{1}$$

Provided that, CC represents current battery capacity of each of the battery cells C1 to Cn (in this embodiment, current capacity [Ah]), and is calculated by the remaining discharge capacity calculation unit 202 by using the following Expression (2). SOC is a state of charge (SOC) [%] of each of the battery cells C1 to Cn, and can be estimated by various known methods such as a current integration method, an acquisition method from an open circuit voltage (voltage method), and a method in which the current integration method and the voltage method are combined.

$$CC\ [Ah] = C_0 \times SOH/100 \tag{2}$$

Provided that, $C_0$ represents current capacity (Ah) of each of the battery cells C1 to Cn at the time of a new product and is stored in the storage unit 103. In addition, SOH represents a state of health (SOH) of each of the battery cells C1 to Cn, and is estimated by the remaining discharge capacity calculation unit 202 on the basis of the measurement value acquired by the measurement value acquisition unit 101.

As a method of calculating SOH of each of the battery cells C1 to Cn, various known methods of estimating a variation of SOC with the passage of time and/or an increase in internal resistance with the passage of time may be used. Examples of the method of estimating SOH include a method by a charge and discharge test, a method by a current integration method, a method by open circuit voltage measurement, a method by terminal voltage measurement, a model-based method (the above-described methods are methods using a variation of SOC with the passage of time), a method by AC impedance measurement, a method by adaptive digital filter on the basis of a model, a method by linear regression (inclination of a straight line in I-V characteristics) from I-V characteristics (current-voltage characteristics), and a method by step response (the above-described methods are methods of performing estimation by using an increase in internal resistance with the passage of time).

The storage unit 103 stores a measurement value acquired by the measurement value acquisition unit 101, and a calculation value of the remaining discharge capacity RD of each of the battery cells C1 to Cn which is calculated by the remaining discharge capacity calculation unit 202. In addition, the storage unit 103 stores a program that is executed by the battery control device 200.

The bypass control unit 104 controls open/close switching of the switches S1 and S2 of each of the bypass circuits B1 to Bn on the basis of the remaining discharge capacity RD of each of the battery cells C1 to Cn which is calculated by the remaining discharge capacity calculation unit 202. Specifically, the bypass control unit 104 performs bypassing by each of the bypass circuits B1 to Bn with priority given to the battery cells C1 to Cn in which the remaining discharge capacity RD is smaller in comparison to the other battery cells C1 to Cn so that a difference in the remaining discharge capacity RD among the plurality of battery cells C1 to Cn decreases (first process). In addition, the bypass control unit 104 bypasses each of the battery cells C1 to Cn by each of the bypass circuits B1 to Bn so that the remaining discharge capacity RD of all of the battery cells C1 to Cn are equalized during execution of the first process. In addition, after execution of the first process, the bypass control unit 104 connects all of the battery cells C1 to Cn of which the remaining discharge capacity RD is equalized in series by the bypass circuits B1 to Bn, and performs discharge from all of the battery cells C1 to Cn connected in series until completion of discharge (second process).

The bypass control unit 104 opens the switch S2 and closes the switch S1 with respect to each of the bypass circuits B1 to Bn corresponding to each of the battery cells C1 to Cn to be bypassed. On the other hand, the bypass control unit 104 opens the switch S1 and closes the switch S2 with respect to the bypass circuits B1 to Bn corresponding to the battery cells C1 to Cn connected in series.

Figure 5:
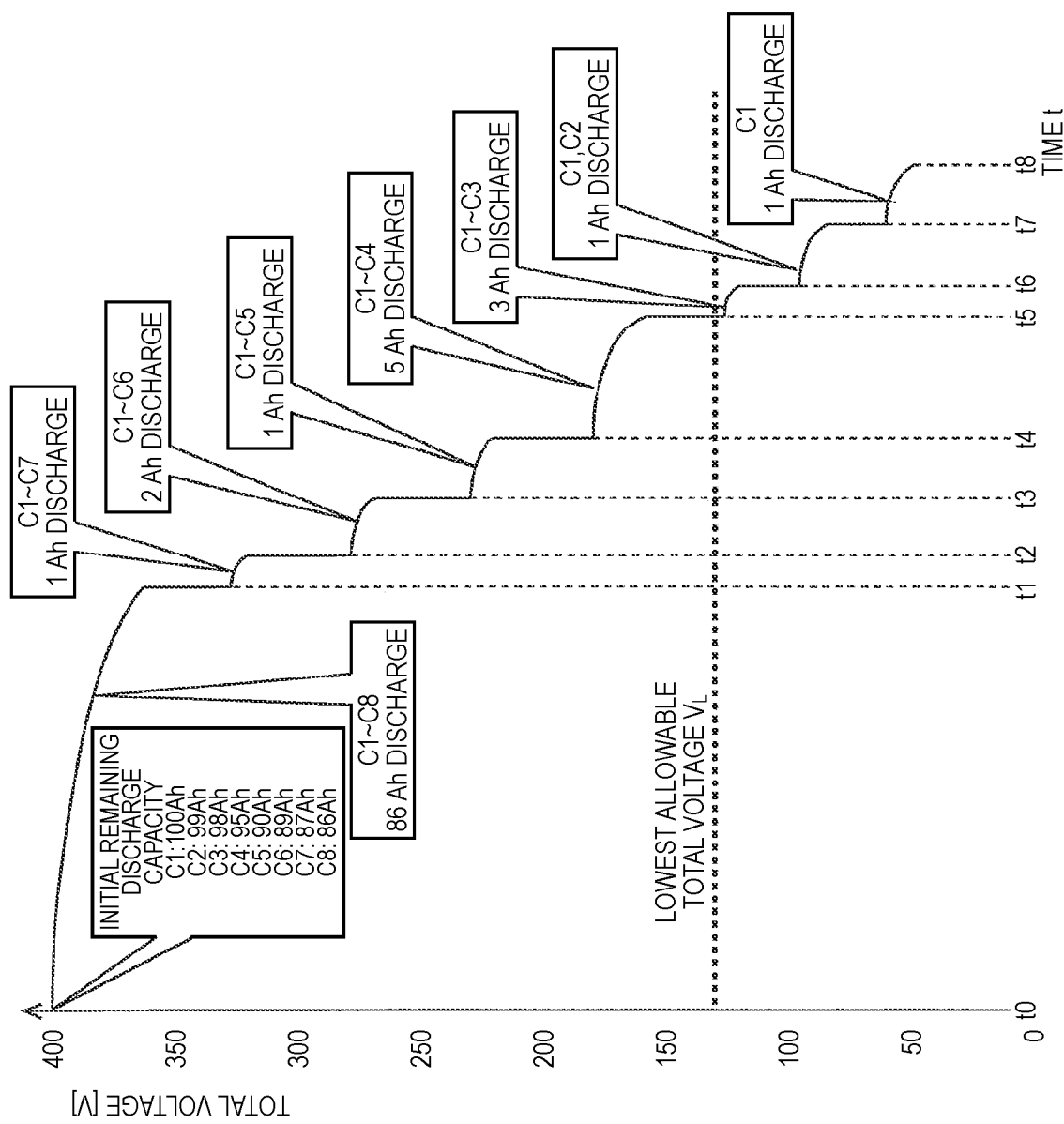
FIG. 5 is a timing chart for describing discharge control of a comparative example.

FIG. 5 is a timing chart for describing discharge control of a comparative example. In addition, FIG. 6 is a table for describing the discharge control of the comparative example illustrated in the timing chart in FIG. 5. As illustrated in the drawings, in the discharge control of the comparative example, discharge of eight battery cells C1 to C8 is controlled.

As illustrated in FIG. 5 and FIG. 6, initial discharge remaining capacity RD of the eight battery cells C1 to C8 is assumed as 100 [Ah], 99 [Ah], 98 [Ah], 95 [Ah], 90 [Ah], 89 [Ah], 87 [Ah], and 86 [Ah], respectively. In the discharge control of the comparative example, first, at time t0, a bypass control unit (not illustrated) connects the eight battery cells C1 to C8 in series. For time from t0 to t1, discharge is performed from the eight battery cells C1 to C8 until the remaining discharge capacity RD of any one of the eight battery cells C1 to C8 connected in series reaches 0 [Ah]. Specifically, the amount of discharge of the eight battery cells C1 to C8 is 86 [Ah], and the battery cell C8 in which the initial remaining discharge capacity RD is minimum at 86 [Ah] is fully discharged.

Next, at time t1, the bypass control unit bypasses the battery cell C8 that is fully discharged by a bypass circuit B8, and causes the seven battery cells C1 to C7 to enter a state of being connected in series. For time from t1 to t2, discharge is performed from the seven battery cells C1 to C7 until the remaining discharge capacity RD of any one of the seven battery cells C1 to C7 connected in series reaches 0 [Ah]. Specifically, the amount of discharge of the seven battery cells C1 to C7 is 1 [Ah], and the battery cell C7 in which the remaining discharge capacity RD is minimum at 1 [Ah] is fully discharged.

Next, at time t2, the bypass control unit bypasses the battery cell C7 that is fully discharged by a bypass circuit B7, and causes the six battery cells C1 to C6 to enter a state of being connected in series. For time from t2 to t3, discharge is performed from the six battery cells C1 to C6 until the remaining discharge capacity RD of any one of the six battery cells C1 to C6 connected in series reaches 0 [Ah]. Specifically, the amount of discharge of the six battery cells C1 to C6 is 2 [Ah], and the battery cell C6 in which the remaining discharge capacity RD is minimum at 2 [Ah] is fully discharged.

Next, at time t3, the bypass control unit bypasses the battery cell C6 that is fully discharged by a bypass circuit B6 and causes the five battery cells C1 to C5 to enter a state of being connected in series. For time from t3 to t4, discharge is performed from the five battery cells C1 to C5 until the remaining discharge capacity RD of any one of the five battery cells C1 to C5 connected in series reaches 0 [Ah]. Specifically, the amount of discharge of the five battery cells C1 to C5 is 1 [Ah], and the battery cell C5 in which the remaining discharge capacity RD is minimum at 1 [Ah] is fully discharged.

Next, at time t4, the bypass control unit bypasses the battery cell C5 that is fully discharged by a bypass circuit B5 and causes the four battery cells C1 to C4 to enter a state of being connected in series. For time from t4 to t5, discharge is performed from the four battery cells C1 to C4 until the remaining discharge capacity RD of any one of the four battery cells C1 to C4 connected in series reaches 0 [Ah]. Specifically, the amount of discharge of the four battery cells C1 to C4 is 5 [Ah], and the battery cell C4 in which the remaining discharge capacity RD is minimum at 5 [Ah] is fully discharged.

Next, at time t5, the bypass control unit bypasses the battery cell C4 that is fully discharged by a bypass circuit B4 and causes the three battery cells C1 to C3 to enter a state of being connected in series. For time from t5 to t6, discharge is performed from the three battery cells C1 to C3 until the remaining discharge capacity RD of any one of the three battery cells C1 to C3 connected in series reaches 0 [Ah]. Specifically, the amount of discharge of the three battery cells C1 to C3 is 3 [Ah], and the battery cell C3 in which the remaining discharge capacity RD is minimum at 3 [Ah] is fully discharged.

Next, at time t6, the bypass control unit bypasses the battery cell C3 that is fully discharged by a bypass circuit B3 and causes the two battery cells C1 and C2 to enter a state of being connected in series. For time from t6 to t7, discharge is performed from the two battery cells C1 and C2 until the remaining discharge capacity RD of any one of the two battery cells C1 and C2 connected in series reaches 0 [Ah]. Specifically, the amount of discharge of the two battery cells C1 and C2 is 1 [Ah], and the battery cell C2 in which the remaining discharge capacity RD is minimum at 1 [Ah] is fully discharged.

Finally, at time t7, the bypass control unit bypasses the battery cell C2 that is fully discharged by a bypass circuit B2 and causes the one battery cell C1 to enter a connected state.

For time from t7 to t8, discharge is performed from the one battery cell C1 until the remaining discharge capacity RD of the one connected battery cell C1 reaches 0 [Ah]. Specifically, the amount of discharge of the one battery cell C1 is 1 [Ah], and the battery cell C1 in which the remaining discharge capacity RD is 1 [Ah] is fully discharged.

Here, from the viewpoint of guaranteeing an operation of a load, it is necessary to prevent a total voltage of the battery system in discharge from being lower than the lowest allowable total voltage $V_L$. For example, the lowest allowable total voltage $V_L$ is set on the basis of specifications of the load, and is determined by an input voltage of a DC/AC inverter in the case of a system association type stationary battery system and is determined by a range of an input voltage of an inverter of a motor in the case of an in-vehicle battery system.

However, in the discharge control of the comparative example, at a point of time at which the number of the battery cells C1 to C8 connected in series decreases to one to three, there is a concern that a total voltage of the battery system may be lower than the lowest allowable total voltage $V_L$. Here, in the discharge control of this embodiment, the above-described first process and second process are executed so that the total voltage of the battery system 1 is maintained to be equal to or greater than the lowest allowable total voltage $V_L$ from initiation of discharge to completion of discharge. Hereinafter, discharge control of this embodiment will be described in detail.

Figure 7:
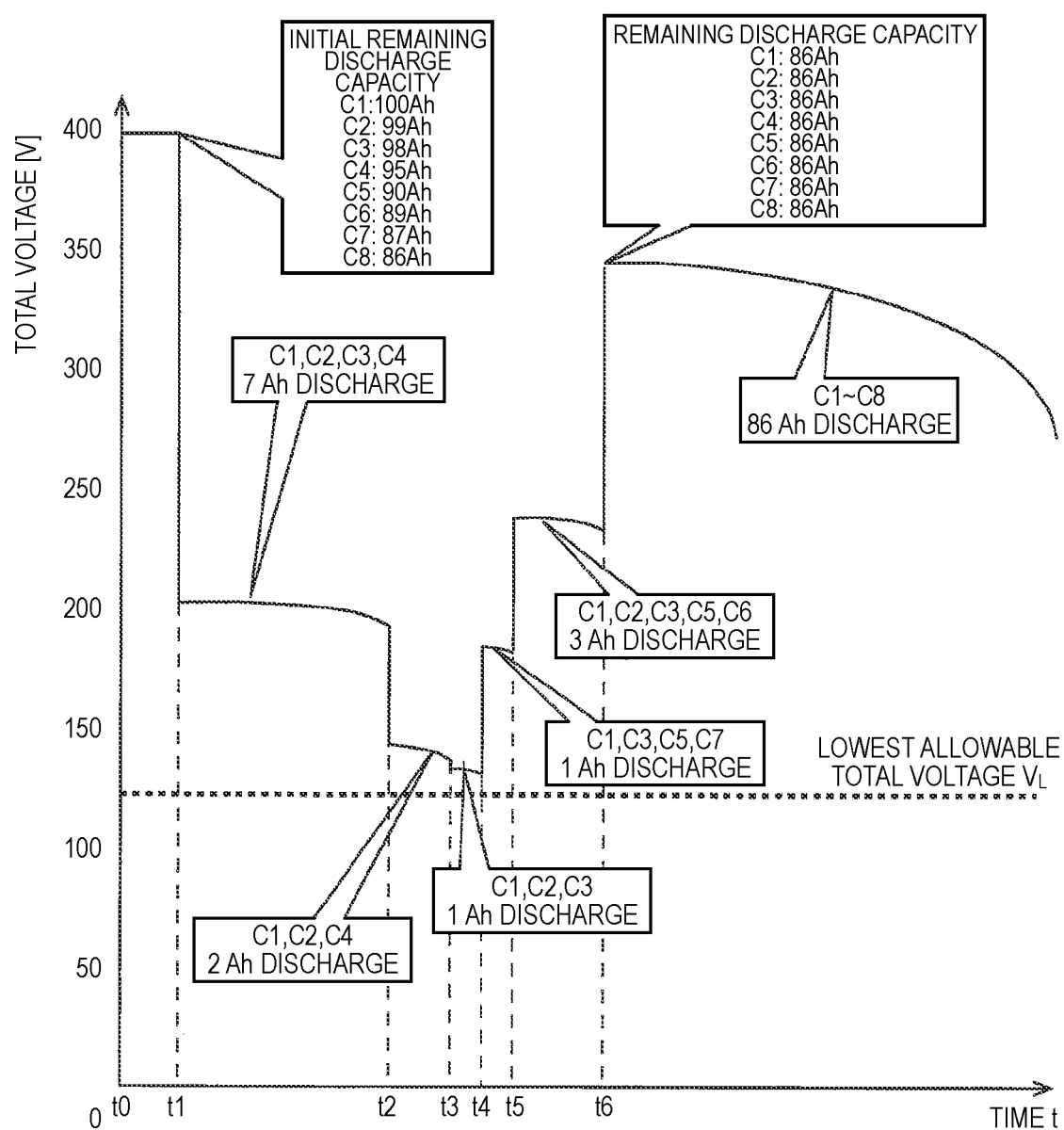
FIG. 7 is a timing chart for describing discharge control of still another embodiment of the invention.

FIG. 7 is a timing chart for describing the discharge control of this embodiment. In addition, FIG. 8 is a table for describing the discharge control of this embodiment illustrated in the timing chart in FIG. 7. As illustrated in the drawings, in the discharge control of this embodiment, discharge of eight battery cells C1 to C8 is controlled.

As illustrated in FIG. 7 and FIG. 8, initial remaining discharge capacity RD of the eight battery cells C1 to C8 is assumed as 100 [Ah], 99 [Ah], 98 [Ah], 95 [Ah], 90 [Ah], 89 [Ah], 87 [Ah], and 86 [Ah], respectively. In the discharge control of this embodiment, the bypass control unit 104 (refer to FIG. 1) performs bypassing with priority given to the battery cells C1 to C8 in which the remaining discharge capacity RD is relatively smaller in comparison to the others so that a difference in the remaining discharge capacity RD among the plurality of battery cells C1 to C8 decreases (first process). In the first process, the bypass control unit 104 bypasses a battery cell (in the illustrated example, C8) in which the initial remaining discharge capacity RD is minimum continuously from initiation to termination of the process, and bypasses the other battery cells (in the illustrated example, C1 to C7) or connects the other battery cells in series. According to this, the remaining discharge capacity RD of all of the battery cells C1 to C8 is made uniform to a minimum value (in the illustrated example, 86 Ah) of the initial remaining discharge capacity RD. In addition, in the first process, the bypass control unit 104 does not bypass a battery cell (in the illustrated example, C1) in which the initial remaining discharge capacity RD is maximum from initiation to termination of the process and maintains the battery cell in a connected state. The bypass control unit 104 connects or bypasses the other battery cells (in the illustrated example, C2 to C7) so that the number of times of bypassing further increases as the remaining discharge capacity RD is smaller, thereby gradually decreasing a difference in the remaining discharge capacity RD. Note that, the first process stated here is illustrative only, and may be appropriately modified.

Here, in the first process, the bypass control unit 104 selects the battery cells C1 to C8 to be bypassed to satisfy a condition in which a total voltage of the battery system 1' is equal to or greater than the lowest allowable total voltage $V_L$. In the illustrated example, the bypass control unit 104 connects three or greater battery cells C1 to C7 in series from initiation to termination of the first process to maintain the total voltage of the battery system 1' to be greater than the lowest allowable total voltage $V_L$.

In the example of the first process illustrated in FIG. 7, first, at time t1, the bypass control unit 104 bypasses the battery cells C5, C6, and C7 in which the initial remaining discharge capacity RD is relatively smaller in comparison to the others in addition to the battery cell C8 in which the remaining discharge capacity RD is minimum, and connects the battery cells C1, C2, C3, and C4, in which the initial remaining discharge capacity RD is relatively larger in comparison to the others, in series. For time from t1 to t2, discharge is performed from the four battery cells C1 to C4 connected in series. The amount of discharge from the four battery cells C1 to C4 is 7 [Ah]. Note that, for example, the remaining discharge capacity RD of the battery cell C4 can also be reduced to 86 [Ah] as a target value by setting the amount of discharge from the four battery cells C1 to C4 to 9 [Ah].

Next, at time t2, the bypass control unit 104 bypasses the battery cell C3 in addition to the battery cells C5 to C8, and connects the other battery cells C1, C2, and C4 in series. For time from t2 to t3, discharge is performed from the three battery cells C1, C2, and C4 connected in series. The amount of discharge from the three battery cells C1, C2, and C4 is 2 [Ah]. According to this, the remaining discharge capacity RD of the battery cell C4 decreases to 86 [Ah] as the target value.

Next, at time t3, the bypass control unit 104 bypasses the battery cell C4 in which the remaining discharge capacity RD has decreased to the target value in combination with the battery cells C5 to C8, and the bypassed battery cell C3 is maintained in a connected state. For time from t3 to t4, discharge is performed from the three battery cells C1, C2, and C3 connected in series. The amount of discharge from the three battery cells C1, C2, and C3 is 1 [Ah].

Next, at time t4, the bypass control unit 104 bypasses the battery cells C2 and C6 in combination with the battery cells C4 and C8 in which the remaining discharge capacity RD has decreased to the target value, and maintains the bypassed battery cells C5 and C7 in a connected state. For time from t4 to t5, discharge is performed from the four battery cells C1, C3, C5, and C7 connected in series. The amount of discharge from the four battery cells C1, C3, C5, and C7 is 1 [Ah]. According to this, the remaining discharge capacity RD of the battery cell C7 decreases to 86 [Ah] as the target value. In addition, the remaining discharge capacity RD of the battery cells C1, C2, C3, C5, and C6 is made uniform to 89 [Ah].

Next, at time t5, the bypass control unit 104 bypasses the battery cells C4, C7, and C8 in which the remaining discharge capacity RD has decreased to the target value, and maintains the bypassed battery cells C2 and C6 in a connected state. For time from t5 to t6, discharge is performed from the five battery cells C1, C2, C3, C5, and C6 connected in series. The amount of discharge from the five battery cells C1, C2, C3, C5, and C6 is 3 [Ah]. According to this, the remaining discharge capacity RD of the battery cells C1, C2, C3, C5, and C6 decreases to 86 [Ah] as the target value, and the remaining discharge capacity RD of all of the battery cells C1 to C8 is made uniform to 86 [Ah] as the target value.

Next, at time t6, the bypass control unit 104 connects all of the battery cells C1 to C8 in series. From time t6 to completion of discharge, discharge is performed from all of the battery cells C1 to C8 connected in series (second process). The amount of discharge of all of the battery cells C1 to C8 in the second process is 86 [Ah]. According to this, all of the battery cells C1 to C8 are fully discharged.

As described above, the battery control device 200 of this embodiment performs the first process of reducing a difference in the remaining discharge capacity RD of the plurality of battery cells C1 to Cn by performing bypassing by the bypass circuits B1 to Bn with priority given to the battery cells C1 to Cn in which the remaining discharge capacity RD is relatively smaller in comparison to the other battery cells C1 to Cn without sequentially bypassing the battery cells C1 to Cn from which discharge is completed as in the above-described comparative example. In addition, after execution of the first process, the battery control device 200 connects all of the battery cells C1 to Cn in series, and performs discharge therefrom until completion of discharge. According to this, while discharge of all of the battery cells C1 to Cn is completed after execution of the first process, it is possible to maintain a state in which all of the battery cells C1 to Cn are connected in series.

Accordingly, during the period, the total voltage of the battery system 1' can be maintained to a higher state in comparison to the above-described comparative example. In addition, since the total voltage can be maintained to the high state, time capable of outputting desired discharge power from the battery pack 10 can be further lengthened in comparison to the above-described comparative example.

In addition, in the first process, the battery control device 200 of this embodiment decreases the remaining discharge capacity RD of the plurality of battery cells C1 to Cn to a minimum value at an initiation time of the first process. According to this, discharge completion timing of all of the battery cells C1 to Cn is made uniform, and bypass timing of the battery cells C1 to Cn from which discharge has been completed can be made uniform.

In addition, the battery control device 200 of this embodiment selects the battery cells C1 to Cn to be bypassed so that the total voltage of the battery system 1' in execution of the first process is maintained to be equal to or greater than the lowest allowable total voltage $V_L$ of the battery system 1'. According to this, in the first process, it is possible to make the remaining discharge capacity RD of the plurality of battery cells C1 to Cn uniform while preventing the total voltage of the battery system 1' from being lower than the lowest allowable total voltage $V_L$ of a power system (not illustrated).

Figure 10:
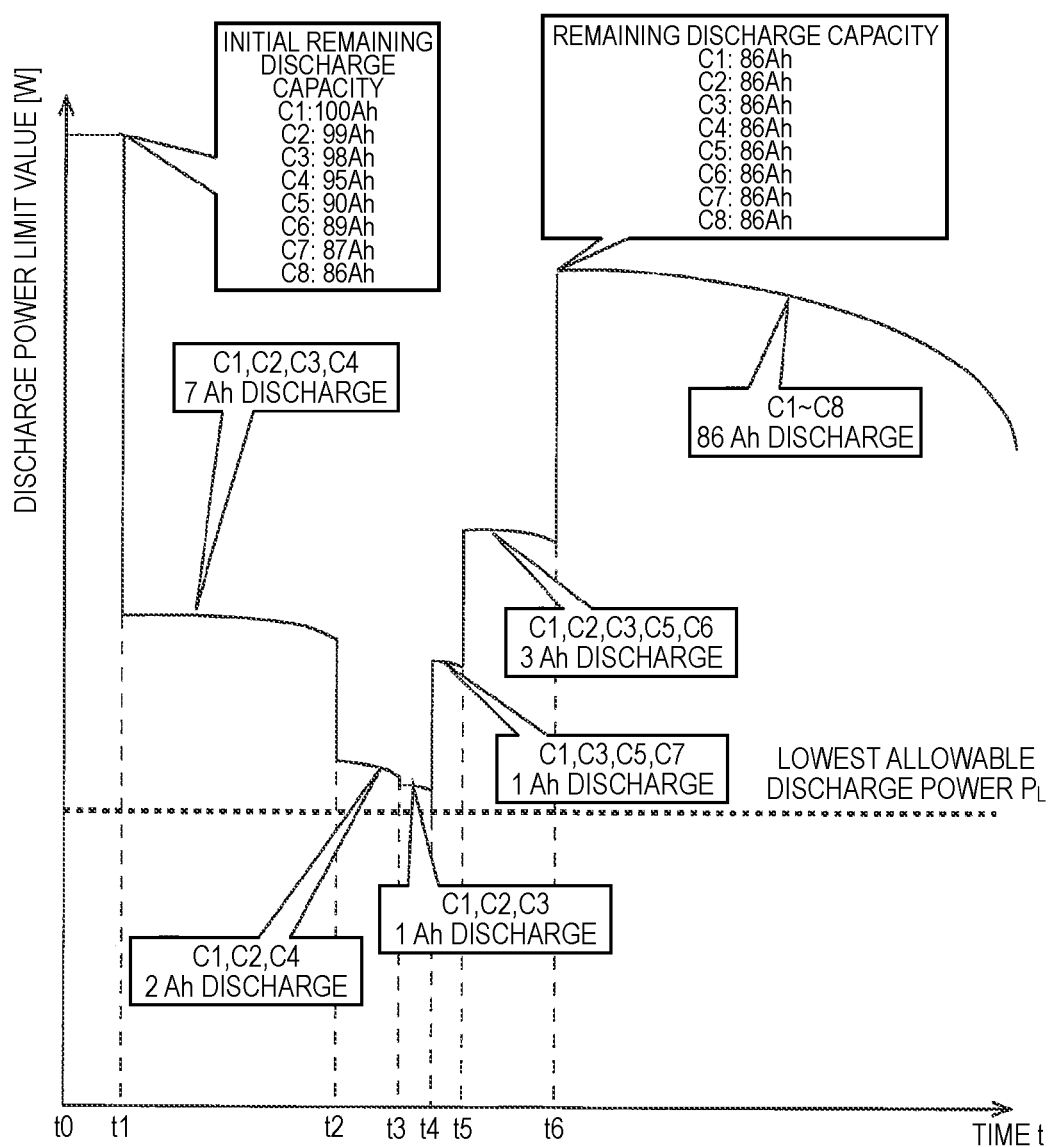
FIG. 10 is a timing chart for describing a modification example of the discharge control illustrated in the timing chart in FIG. 7.

FIG. 10 is a timing chart for describing a modification example of the discharge control illustrated in the timing chart in FIG. 7. In the discharge control illustrated in the drawing, the discharge power limit value [W] in execution of the first process is maintained to be equal to or greater than lowest allowable discharge power $P_L$. Here, the discharge power limit value [W] is a value obtained by multiplying a minimum value among discharge current limit values of the battery cells C1 to Cn by the total voltage of the battery system 1. Note that, the lowest allowable discharge power $P_L$ may be a constant value or may be a value that fluctuates in accordance with various conditions.

Hereinbefore, the invention has been described on the basis of the embodiment. However, the invention is not limited to the above-described embodiment, and a modification may be made within a range not departing from the gist of the invention, or a publicly known or well-known technology may be appropriately combined thereto.

For example, in the above-described embodiment, the remaining discharge quantity until completion of discharge of each of the battery cells C1 to Cn is defined with the remaining discharge capacity RD [Ah] that is current capacity, but the remaining discharge quantity until completion of discharge of each of the battery cells C1 to Cn may be defined with something correlated with the index, or may be defined with SOC, an open circuit voltage (OCV), or the like.

In addition, in the above-described embodiment, in the first process, the remaining discharge capacity RD of the plurality of battery cells C1 to Cn is decreased to the minimum value at the initiation time of the first process, but the remaining discharge capacity RD of the plurality of battery cells C1 to Cn may be decreased until the remaining discharge capacity RD is lower than the minimum value at the initiation time of the first process.

In addition, from the viewpoint of making uniform discharge completion timings of all of the battery cells C1 to Cn at which the remaining discharge capacity RD of all of the battery cells C1 to Cn has been finally spent, it is preferable that the remaining discharge capacity RD of the plurality of battery cells C1 to Cn is made uniform in the first process. However, it is not necessary to make uniform the remaining discharge capacity RD of the plurality of battery cells C1 to Cn in the first process, and a difference in the remaining discharge capacity RD of the plurality of battery cells C1 to Cn may be decreased in the first process.

Figure 9:
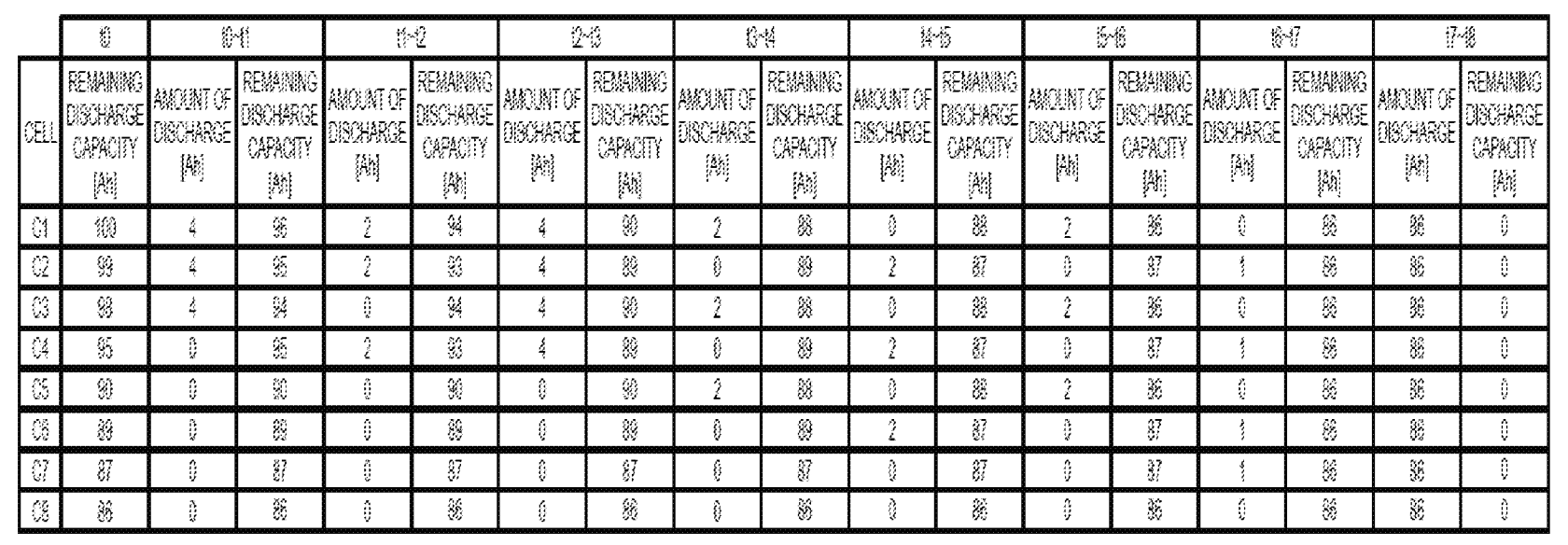

In addition, a combination of the battery cells C1 to C8 which are connected in each time or the amount of discharge from each of the battery cells C1 to C8 in each time is illustrative only. For example, a combination of the battery cells C1 to C8 which are connected in each time may be selected, or the amount of discharge from each of the battery cells C1 to C8 in each time may be adjusted as illustrated in a table in FIG. 9.

In the battery control device of the invention, the predetermined value may be any one value among remaining current capacity of the battery cell, a charge rate of the battery cell, and a voltage of the battery cell.

In the battery control device of the invention, the predetermined value may be set on the basis of a discharge current limit value that is an allowable value of a discharge current of the battery cell, a system minimum current value that is a current value necessary for a system of a power supply destination to operate in a power saving mode, and a system standard current value that is a threshold value that imposes a limitation on power consumption of the system of the power supply destination which is higher than the system minimum current value and is lower than a maximum value of the discharge current limit value.

In the battery control device of the invention, the predetermined value may be set to be equal to or greater than remaining quantity at which the discharge current limit value and the system standard current value match each other.

In the battery control device of the invention, a total voltage of the battery system in execution of a process of bypassing the battery cell by the bypass circuit may be equal to or greater than a lowest allowable total voltage of the battery system, or a discharge power limit value in execution of the process of bypassing the battery cell by the bypass circuit may be equal to or greater than lowest allowable discharge power.

In the battery control device of the invention, in the first process, the remaining discharge quantity until completion of discharge of the plurality of batteries may be reduced to be equal to or less than a minimum value at an initiation time of the first process.

In the battery control device of the invention, a total voltage of the battery system in execution of the first process may be equal to or greater than a lowest allowable total voltage of the battery system, or a discharge power limit value in execution of the process of bypassing the battery cell by the bypass circuit may be equal to or greater than lowest allowable discharge power.

According to the invention, control of bypassing a battery cell in which remaining quantity decreases to a predetermined value or less, and performing discharge from the other all battery cells or except for a part thereof is sequentially executed. In addition, after the remaining quantity of all of the plurality of battery cells or except for a part thereof is made uniform to the predetermined value, bypassing for all of the plurality of battery cells or except for a part thereof is released, and discharge is performed from all of the plurality of battery cells or except for a part thereof. In addition, according to the invention, a difference in a remaining discharge quantity until completion of discharge of the plurality of batteries is decreased by performing bypassing with priority given to a battery in which the remaining discharge quantity until completion of discharge is smaller in comparison to the other batteries, and then discharge of the plurality of batteries is completed. According to this, in all of the plurality of battery cells or except for a part thereof, discharge can be performed by using discharge capacity with efficiency, and time for which a desired output is obtained can be lengthened.

According to the present invention, a battery system includes a plurality of batteries connected in series, a bypass circuit that bypasses each of the batteries, and a battery control device. The battery control device executes a first process of reducing a difference in a remaining discharge quantity until completion of discharge of the plurality of batteries by performing bypassing by the bypass circuit with priority given to a battery in which the remaining discharge quantity until completion of discharge is smaller in comparison to the other batteries, and a second process of completing discharge of the plurality of batteries after the first process.

What is claimed is:

1. A battery control device that controls a battery system including a plurality of battery cells connected in series, and a bypass circuit that bypasses each of the battery cells,
   wherein discharge is performed from each of the battery cells until remaining quantity of the battery cell decreases to a corresponding predetermined value, the predetermined value not being the same for all of the battery cells,
   in a case where the remaining quantity of less than all of the battery cells decreases to their corresponding predetermined values, the battery cell is bypassed by the bypass circuit,
   in a case where the remaining quantity of all of the plurality of battery cells decreases to their corresponding predetermined values, discharge is performed from all of the plurality of battery cells,
   after the remaining quantity of all of the battery cells is made uniform to their corresponding predetermined values, bypassing of all of the battery cells is released and discharge is performed from all of the battery cells,
   wherein a discharge power from the battery system is maintained at a constant level from the start of one discharge cycle until the remaining quantity of all of the battery cells is made uniform to their corresponding predetermined values, and while bypassing of all of the battery cells is released and discharge is performed from all of the battery cells,
   wherein a discharge power from the battery system is released to be maintained at a constant level after bypassing of all of the battery cells is released and discharge is performed from all of the battery cells and a discharge current of each of the battery cells has been reduced to a discharge current limit value that is an allowable value of the discharge current of each of the battery cells,
   wherein the discharge current limit value is constant at a maximum value at the beginning and decreases from the middle as the remaining quantity of the battery cell decreases,
   wherein the corresponding predetermined value of each of the battery cells is set to be equal to or greater than the remaining quantity of the battery cell at a point of time at which the discharge current limit value starts to decrease from the maximum value,
   wherein the corresponding predetermined value of each of the battery cells is any one value among remaining current capacity of the battery cell, a charge rate of the battery cell, and a voltage of the battery cell,
   wherein the corresponding predetermined value of each of the battery cells is set based on the discharge current limit value, and a system minimum current value that is a current value necessary for a system of a power supply destination to operate in a power saving mode, and
   wherein the corresponding predetermined value of each of the battery cells is set so that a difference between the remaining quantity of the battery cell and the corresponding predetermined value at a point of time at which the discharge current limit value and the system minimum current value match each other becomes constant over all of the battery cells.

2. The battery control device according to claim 1, wherein a total voltage of the battery system in execution of a process of bypassing the battery cell by the bypass circuit is equal to or greater than a lowest allowable total voltage of the battery system, or a discharge power limit value in execution of the process of bypassing the battery cell by the bypass circuit is equal to or greater than lowest allowable discharge power.

* * * * *